United States Patent
Meyer

(10) Patent No.: US 7,526,147 B2
(45) Date of Patent: Apr. 28, 2009

(54) SENSOR ARRAY FOR PERIMETER DEFENSE

(75) Inventor: A. Douglas Meyer, Woodland Hills, CA (US)

(73) Assignee: Northrop Grumman, Inc., Woodland Hills, CA (US)

( * ) Notice: Subject to any disclaimer, the term of this patent is extended or adjusted under 35 U.S.C. 154(b) by 611 days.

(21) Appl. No.: 11/218,037

(22) Filed: Aug. 31, 2005

(65) Prior Publication Data

US 2007/0280693 A1   Dec. 6, 2007

(51) Int. Cl.
- *G02B 6/00* (2006.01)
- *G01J 1/04* (2006.01)
- *G01J 1/42* (2006.01)
- *G01J 5/08* (2006.01)
- *G01J 4/00* (2006.01)

(52) U.S. Cl. .............. 385/12; 385/13; 385/14; 385/15; 385/16; 250/227.11; 250/227.12; 250/227.13; 250/227.14; 250/227.15; 250/227.16; 250/227.17; 250/227.18; 250/227.19

(58) Field of Classification Search ............ 385/12–13, 385/15–16, 24; 398/79; 367/149; 356/460, 356/478; 250/227.19, 227.18, 227.11, 227.12, 250/227.13, 227.14, 227.15, 227.16, 227.17
See application file for complete search history.

(56) References Cited

U.S. PATENT DOCUMENTS

| 4,770,535 | A  | * | 9/1988 | Kim et al. ............... 356/478 |
| 6,208,590 | B1 | * | 3/2001 | Kim et al. ............... 367/149 |
| 6,282,334 | B1 | * | 8/2001 | Hodgson et al. ........... 385/12 |
| 6,445,455 | B1 | * | 9/2002 | Hall et al. ............... 356/460 |
| 2007/0280693 | A1 | * | 12/2007 | Meyer ..................... 398/79 |

* cited by examiner

*Primary Examiner*—Frank G Font
*Assistant Examiner*—Guy G Anderson
(74) *Attorney, Agent, or Firm*—Lynn & Lynn

(57) ABSTRACT

An intensity modulated broadband optical signal source is arranged to produce optical signals in a plurality of wavelength bands. A demultiplexer/multiplexer pair receives optical signals from the optical signal source and produces a separate optical signal for each wavelength band. An optical coupler is arranged to receive the separate optical signals. Optical fiber loops connected to the optical coupler guides both clockwise and counter clockwise waves for each of the separate optical signals. The optical signals propagate through a sensor in each loop and then combine in the optical coupler to form a plurality of interference signals in each wavelength band. A multiplexer is optically coupled to the optical coupler to receive the interference signals therefrom, and a detector array having a selected detector corresponding to the each of the plurality of wavelength bands is arranged to provide an electrical signal that indicates the interference signals for each wavelength band.

3 Claims, 4 Drawing Sheets

SENSOR ARRAY FOR PERIMETER DEFENSE

BACKGROUND OF THE INVENTION

This invention relates generally to fiber optic sensors and particularly to a fiber optic sensor array arranged for identifying and tracking an intrusion into a defined region.

Current perimeter defense systems utilizing optical fiber are limited in the feedback they provide the user. Most only offer a solution that an intrusion has occurred and localization is not particularly accurate. Additionally, there is no means to track and identify the intrusion as to what type an object it is. There are also problems with these current devices as the discrimination between environmental conditions (wind, rain, etc.) is poor and triggers a false alarm dispatching security forces unnecessarily.

SUMMARY OF THE INVENTION

A perimeter defense system according to the present invention comprises an intensity modulated broadband optical signal source arranged to produce optical signals in a plurality of wavelength bands and a demultiplexer/multiplexer pair arranged to receive optical signals from the optical signal source and produce a separate optical signal for each of the plurality of wavelength bands. An optical coupler is arranged to receive the separate optical signals. A first optical fiber having a first portion is connected to the optical coupler and arranged to guide a clockwise wave for each of the separate optical signals along a corresponding optical path. The first optical fiber has a second portion connected to the optical coupler and arranged to guide a counter clockwise wave for each of the separate optical signals along the corresponding optical paths. Each of the corresponding optical paths includes a second optical fiber optically coupled to the first optical fiber such that the clockwise and counter clockwise waves for each of the separate optical signals are coupled into the second optical fiber and a plurality of sensors optically coupled to the second optical fiber such that the clockwise and counter clockwise waves for each of the separate optical signals propagate through the plurality of sensors and then combine in the optical coupler to form a plurality of interference signals in each wavelength band. A multiplexer is optically coupled to the optical coupler to receive the interference signals therefrom, and a detector array having a selected detector corresponding to the each of the plurality of wavelength bands is arranged to provide an electrical signal that indicates the interference signals for each wavelength band.

BRIEF DESCRIPTION OF THE DRAWINGS

FIG. 3 illustrates a sensor array according to the present invention used in perimeter defense zones;

DETAILED DESCRIPTION OF THE INVENTION

Figure 1:
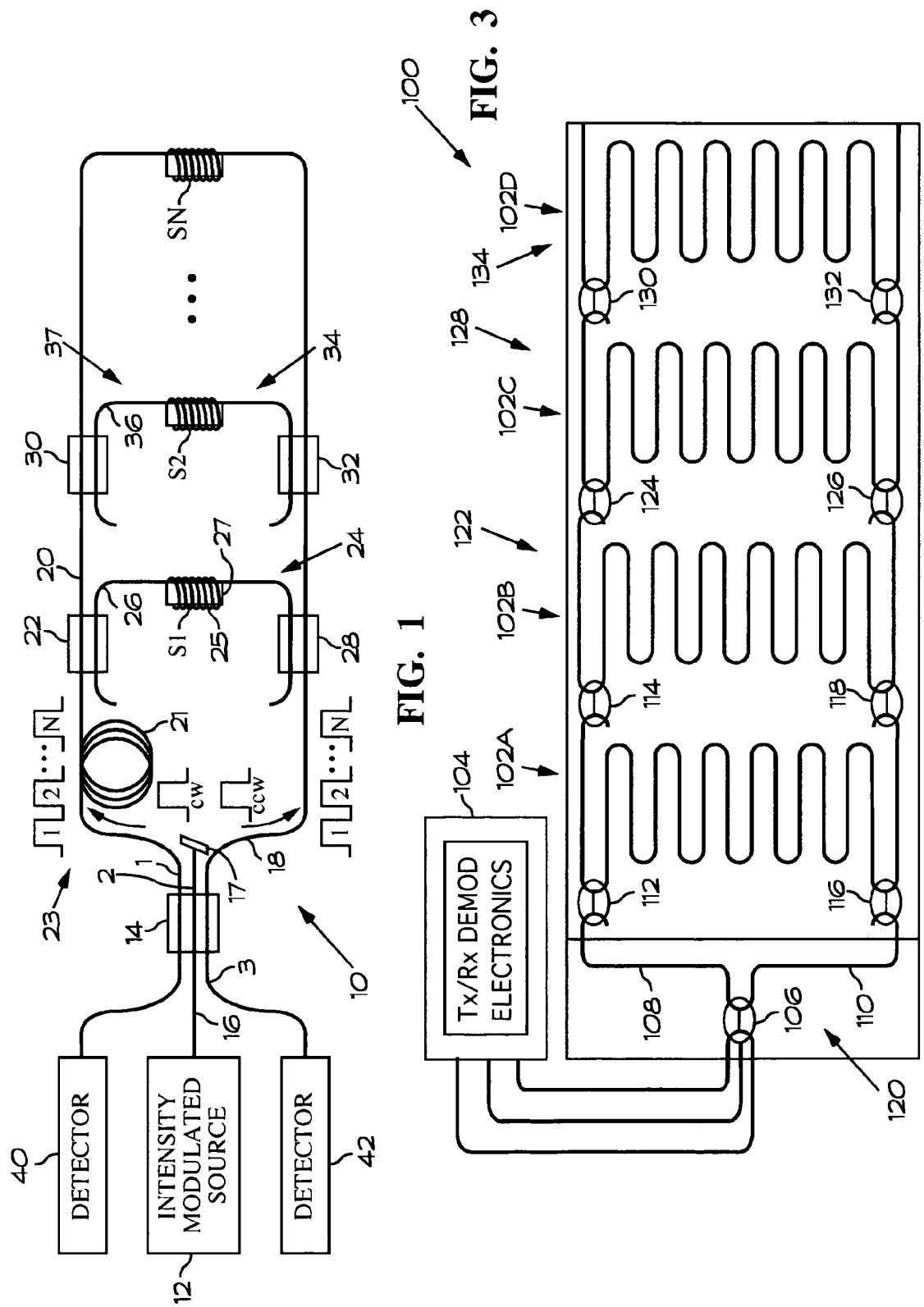
FIG. 1 illustrates a basic sensor array structure according to the present invention.

Referring to FIG. 1, a sensor array 10 includes an intensity modulated optical signal source 12 whose output is input to a 3×3 optical coupler 14 via an optical fiber 16. The optical coupler 14 splits the signal equally among its three output ports 1-3 and forms a clockwise (cw) pulse and a counter clockwise (ccw) pulse that propagate in an optical fiber loop 18 that is connected to the output ports 1 and 3 of the optical coupler 14. Light that remains in the optical fiber 16 after passing through the coupler 14 is absorbed by a light absorber 17.

The optical fiber loop 18 serves as a telemetry bus 20. The cw pulse travels along the telemetry bus 20 through a delay coil 21 formed therein to a bus coupler 22 that splits off a portion of the light in the cw pulse directs it to a sensor rung 24 via an optical fiber 26. The sensor rung 24 includes a first sensor S1 that in the illustrated embodiment is preferably a hydrophone. The sensor S1 may be formed by wrapping a coiled portion 25 of the optical fiber 26 around a compliant mandrel 27 that is responsive to mechanical vibration effecting a physical diameter and/or length change in the mandrel 27 thereby straining the coiled portion 25 producing an optical difference in the cw and ccw waves in the sensor S1. The ccw pulse travels to a bus coupler 28 that is also coupled into the sensor rung 24 via the optical fiber 26. The two bus couplers 22 and 28 cause the two counter propagating pulses to traverse the sensor rung 24 and the sensor S1 located therein and form a first Sagnac loop 23.

The cw and ccw pulses propagate in the telemetry bus 20 to bus couplers 30 and 32, respectively, which couple portions of the corresponding pulses into a second sensor rung 34 via an optical fiber 36. The sensor rung 34 includes a sensor S2 that is essentially identical to the sensor S1 and that is included in a second Sagnac loop 37.

A number of pairs of bus couplers (not shown) that are similar to the pair of bus couplers 22 and 28 and the pair of bus couplers 32 and 34 may be placed serially along the telemetry bus 20 to create several nested Sagnac loops and form N-sensor rungs. Pulses returning from each sensor rung 24, 34 etc. are independent from each other and carry only the sensed information from that particular sensor's position. The cw-pulse and ccw-pulse from each particular sensor rung recombine at the 3×3 coupler 14 and interfere with each other. The resultant output signals are directed to a pair of photodetectors 40 and 42. The output signals detected by the two photodetectors 40 and 42 are modulated in amplitude at the frequency of the signal detected by the sensor.

The intensity modulated optical signal source preferably comprises either a superfluorescent fiber source (SFS) or a broadband optical source with an optical spectral width of 30 nm or greater in wavelength. Wavelength slicing of the broadband signal can be utilized to generate several distinct wavelength bands.

Figure 2:
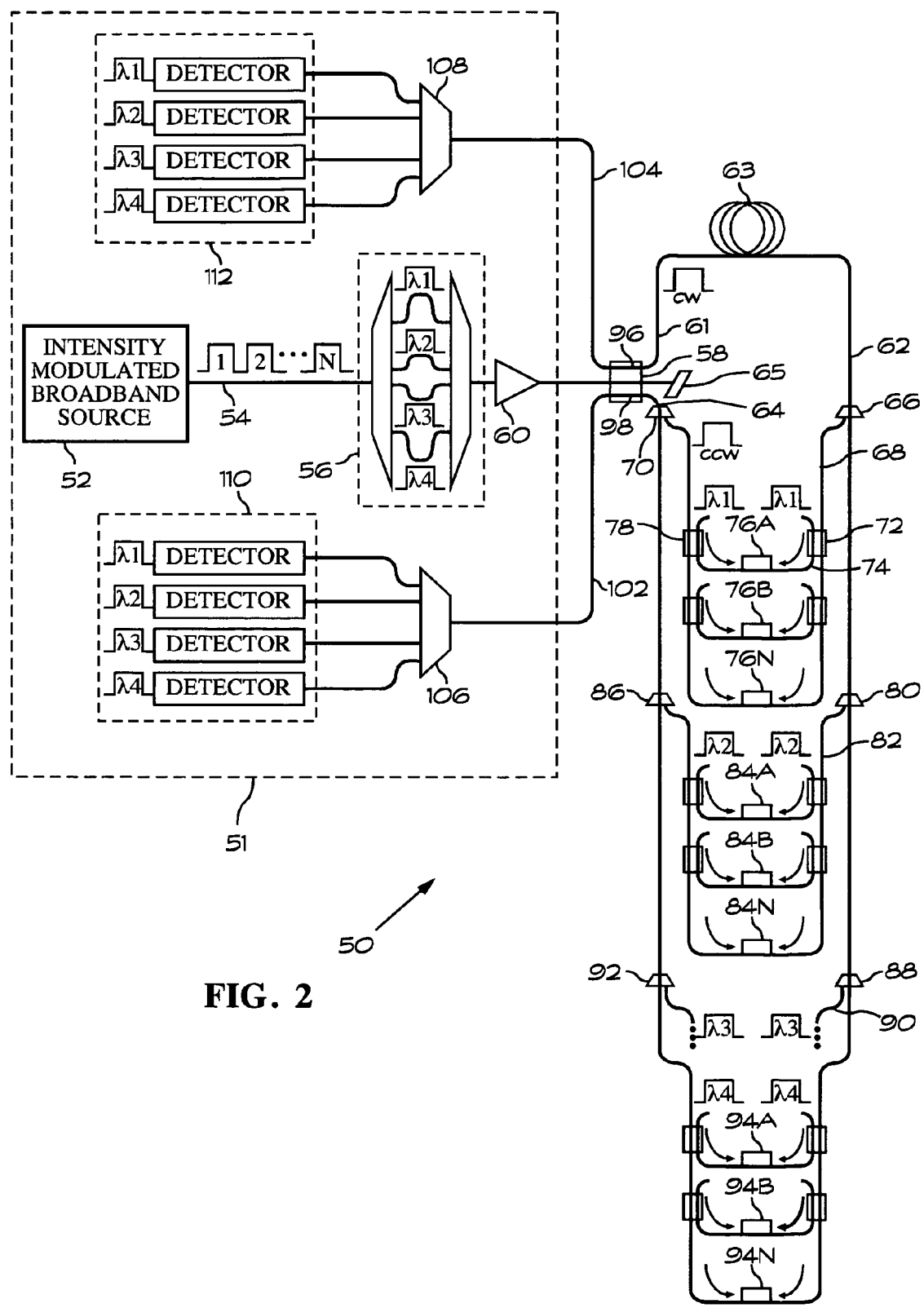
FIG. 2 illustrates a multi-wavelength Sagnac sensor array architecture according to the present invention.

FIG. 2 shows architecture for an array 50 having a multi-wavelength topology. FIG. 2 includes a transmitter/demodulation module 51 that may be included in the invention. The transmitter/demodulation module 51 includes an intensity modulated broadband source 52 that provides broadband optical pulses to an optical fiber 54. The optical fiber 54 guides the broadband pulses to a wavelength slicer (demultiplexer) and multiplexer pair 56 that is placed just after the intensity-modulated source 52. The wavelength slicer and multiplexer pair 56 divides each broadband pulse output from the intensity modulated broadband source into a plurality of pulses of wavelength bands $\lambda_1, \lambda_2, \lambda_3$ and $\lambda_4$ that pass through a 3×3 optical coupler 58. A single optical amplifier 60 can be inserted before the coupler 58 to provide additional signal gain and extend the number of sensors and/or reach of the array system. Once the wavelength bands have been established, the system functions in the same manner as described by FIG. 1.

A first portion of the signal forms a clockwise signal that is coupled into a first portion 61 of an optical fiber 62. A second portion of the signal forms a clockwise signal that is coupled into a first portion 64 of the optical fiber 62. An absorber 65 absorbs any portion of the optical signal guided by the optical fiber 54 that remains in the optical fiber 54.

The clockwise pulse propagates in the optical fiber 62 to a wavelength division multiplexer (WDM) 66. The optical fiber 62 may include a delay coil 63 formed between the optical coupler 58 and the WDM 66. The WDM 66 couples pulses in the $\lambda_1$ band into an optical fiber 68. The optical fiber 68 is formed as a loop between the WDM 66 and a WDM 70. The optical fiber 68 guides the clockwise pulses in the $\lambda_1$ band to an optical coupler 72. The optical coupler 72 couples a portion of the clockwise pulses in the $\lambda_1$ band into an optical fiber 74, which then guides the pulses into a sensor 76A that may be formed by coiling the optical fiber 74 around a compliant mandrel (not shown) in a manner well known in the art. The clockwise pulse in the $\lambda_1$ band propagates in the optical fiber 74 to an optical coupler 78 after passing through the sensor 76A. The optical coupler 78 couples the clockwise pulse in the $\lambda_1$ band back into the optical fiber 68 that then guides them to the WDM 70. Clockwise pulses in the $\lambda_1$ band are guided to all of plurality of sensors 76A, 76B, . . . 76N and then to the WDM 70, which couples the pulses into the optical fiber 62.

Clockwise pulses in the $\lambda_2$ band propagate to a WDM 80 that directs them to an optical fiber 82. Clockwise pulses in the optical fiber 82 are guided to a plurality of sensors 84A, 84B, . . . 84N. These pulses then propagate to a WDM 86 that directs them back into the optical fiber 62.

Clockwise pulses in the $\lambda_3$ band propagate to a WDM 88 that directs them to an optical fiber 90. Clockwise pulses in the optical fiber 90 are guided to a plurality of sensors (not shown) that are generally identical to the sensors 84A, 84B, . . . 84N previously described. A WDM 92 directs the clockwise signals in the $\lambda_3$ band into he optical fiber 62.

Clockwise pulses in the $\lambda_4$ band in the optical fiber 62 are guided to a plurality of sensors 94A, 94B, . . . 94N. After having passed through the plurality of sensors 94A, 94B, . . . 94N, pulses in the $\lambda_4$ band propagate in the optical fiber 62 to the WDM 70. These pulses pass through the WDM 70, remaining in the optical fiber 62.

The WDM 70 directs clockwise pulses in the wavelength bands $\lambda_1, \lambda_2$ and $\lambda_3$ into the optical fiber 62, which guides clockwise pluses of all wavelength bands back to the 3×3 optical coupler 58.

The optical fiber 62 is formed as a loop having a first fiber portion 96 that is included in the 3×3 optical coupler 58 and a second fiber portion 98 that is also included in the 3×3 optical coupler 58. The first and second fiber portions 96 and 98 are on opposite sides of the optical fiber 54 in the 3×3 optical coupler 58. Counter clockwise pulses in the wavelength bands $\lambda_1, \lambda_2, \lambda_3$ and $\lambda_4$ travel the same paths as the clockwise pulses, but in opposite directions. Therefore, each sensor has a pair of counter propagating waves. The optical fiber 62 guides the counter clockwise pulses back to the optical coupler 58 where the counter clockwise and clockwise signals combine to form a plurality of interference signals with each sensor in the array having a corresponding interference signal that is in one of the wavelength bands output by the wavelength slicer 56. Interference signals exit the optical coupler 58 via portions 102 and 104 of the optical fiber 62 and are guided to a wavelength slicer 106 and a wavelength slicer 108, respectively. The wavelength slicers 106 and 108 divide the interference signals input thereto into the same wavelength bands $\lambda_1, \lambda_2, \lambda_3$ and $\lambda_4$ that are output by the wavelength slicer 56. Signals output from the wavelength slicers 106 and 108 are then input to detector arrays 100 and 112, respectively, that each include photodetectors arranged to detect separately each interference signal in the wavelength bands $\lambda_1, \lambda_2, \lambda_3$ and $\lambda_4$.

FIG. 3 shows an effective perimeter defense system 100 that can be made utilizing the sensor architecture according to the present invention. The perimeter defense system 100 utilizes a plurality of parallel sensor rungs 102A-102D to form several perimeter defense sensing zones. A transmit/receive module 103 that may be similar to the transmitter/demodulation module 51 provides optical signals to the sensor rungs 102A-102D and also receives optical signals returned from the sensor rungs 102A-102D.

Optical signals output from the transmit/receive electronics module 104 propagate to an optical coupler 106 that couples the incident signals into an optical fiber 108 that guides a clockwise wave and an optical fiber 110 that guides a counter clockwise wave. The optical fiber 108 guides optical signals to an optical coupler 112 that is arranged to couple part of the incident clockwise signals into the sensor rung 102A and to guide the remainder of the clockwise signal to an optical coupler 114. The optical fiber 110 guides optical signals to an optical coupler 116 that is arranged to couple part of the incident counter clockwise signals into the sensor rung 102A and to guide the remainder of the counter clockwise signal to an optical coupler 118. Thus, the sensor rung 102A carries counterpropagating waves such that the optical couplers 106, 112 and 116 and the optical fibers 108, 110 and the sensor rung 102A form a first Sagnac loop 120. The clockwise wave and the counter clockwise wave traverse the Sagnac loop 120 and combine in the coupler 106 to form an interference signal that is guided back to the transmit/receive electronics module 104.

The optical coupler 114 couples a clockwise signal into the sensor rung 102B while the optical coupler 118 couples a counter clockwise signal into the sensor rung 102B. Thus the optical couplers 106, 112, 114, 116 and 118 and the optical fibers 108, 110 and the sensor rung 102B form a second Sagnac loop 122.

In a similar manner optical couplers 124 and 126 couple clockwise and counter clockwise waves, respectively, into the sensor rung 102C and form a third Sagnac loop 128. Optical couplers 130 and 132 couple clockwise and counter clockwise waves, respectively, into the sensor rung 102D and form a fourth Sagnac loop 134.

The particular perimeter defense system 120 uses signals of only a single wavelength band, however the embodiment of the invention shown in FIG. 3 can easily be extended to a multi-wavelength architecture. It is also important to note that the sensor architecture according to the present invention lends itself to buried, surface, fence and structural mounted applications. Utilization of the multi-wavelength aspects of the architectures will allow a configuration with redundancy to be realized.

Figure 4:
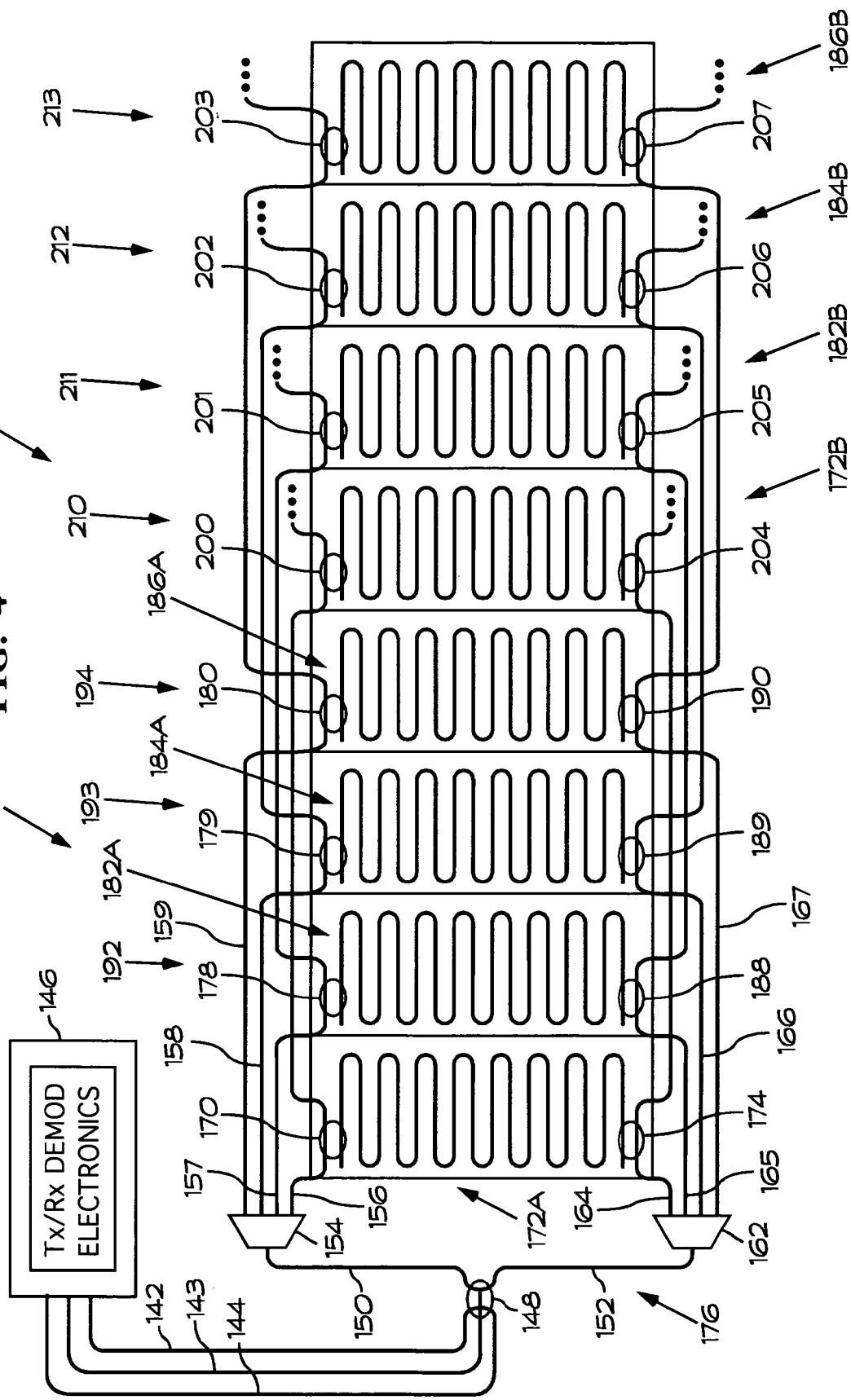
FIG. 4 illustrates a multi-wavelength Sagnac sensor array according to the present invention used in linear perimeter defense zones.

FIG. 4 shows one such configuration of a perimeter defense system 140 that uses four wavelength bands. In the embodiment of the invention shown in FIG. 4 a linear zone array 141 is formed, where no adjacent sensor zones operate in the same wavelength band. This allows a measure of security should a failure occur upstream in the telemetry system.

Three optical fibers 142-144 carry optical signals between a transmit/receive demodulator electronics module 146 and an optical coupler 148. The optical coupler 148 couples signals received from the transmit/receive demodulator electronics module 146 into an optical fiber 150 and into an optical fiber 152. The optical fiber 150 guides signals to a wavelength slicer 154 that divides the signal output from the transmit/receive demodulator electronics module 146 into four wavelength bands $\lambda_1, \lambda_2, \lambda_3$ and $\lambda_4$ to form four clockwise waves that are output from the wavelength slicer/demultiplexer 154 via optical fibers 156-159, respectively. The optical fiber 152 guides signals to a wavelength slicer/demultiplexer 162 that divides the signal output from the transmit/receive demodulator electronics module 146 into four wavelength bands $\lambda_1, \lambda_2, \lambda_3$ and $\lambda_4$ to form four counter clockwise waves that are output from the wavelength slicer 162 via optical fibers 165-167, respectively.

An optical coupler 170 couples signals in the wavelength band $\lambda_1$ from the optical fiber 156 into a sensor zone 172A to form a clockwise signal in the wavelength band $\lambda_1$ therein. In a similar manner, an optical coupler 174 couples signals in the wavelength band $\lambda_1$ from the optical fiber 164 into the sensor zone 172A to form a counter clockwise signal in the wavelength band $\lambda_1$. The clockwise wave in the sensor zone 172A propagates to the optical coupler 174, which couples it into the optical fiber 164. The clockwise wave having the wavelength band $\lambda_1$ then propagates to the wavelength slicer/demultiplexer 162, which couples it into the optical fiber 152. At the same time, the counter clockwise wave in the sensor zone 172A propagates to the optical coupler 170, which couples it into the optical fiber 156. The clockwise wave having the wavelength band $\lambda_1$ then propagates to the wavelength slicer/demultiplexer 154, which couples it into the optical fiber 150.

The optical fibers 150 and 152 guide the clockwise and counter clockwise waves in the wavelength band $\lambda_1$ to the optical coupler 148 to complete a Sagnac loop 176. The waves combine in the optical coupler 148 to form an interference signal that is guided by the optical fibers 142-143 to the transmit/receive demodulator electronics module 146.

Optical couplers 178-180 couple optical signals in the wavelength bands $\lambda_2$, $\lambda_3$ and $\lambda_4$ into corresponding sensor zones 182A, 184A and 186A, respectively, to form clockwise waves in these sensor zones. Optical couplers 188-190 couple optical signals in the wavelength bands $\lambda_2$, $\lambda_3$ and $\lambda_4$ into the sensor zones 182A, 184A and 186A, respectively, to form counter clockwise waves in these sensor zones. As described above for the sensor zone 172A, each of the sensor zones 182A, 184A and 186A is included in a corresponding Sagnac loop 192-194, respectively. The clockwise and counter clockwise waves propagate through their corresponding sensor zones 182A, 184A and 186A back to the optical coupler 148. The clockwise and counter clockwise waves in each wavelength band combine to form separate interference signals corresponding to each wavelength band. All of the interference signals formed in the optical coupler 148 are input to the transmit/receive demodulator electronics module 146 for processing to determine if any disturbance in any of the sensor zones has produced a change in any of the corresponding interference signals.

A large number of additional sensor zones may be included in the perimeter defense system 140. Still referring to FIG. 4, a plurality of optical couplers 200-207 may be used to couple counterpropagating waves into a plurality of sensor zones 172B, 182B, 184B and 186B in the same manner as described above for the sensor zones 172A, 182A, 184A and 186A. The sensor zones 172B, 182B, 184B and 186B are included in corresponding Sagnac loops 210-213.

Figure 5:
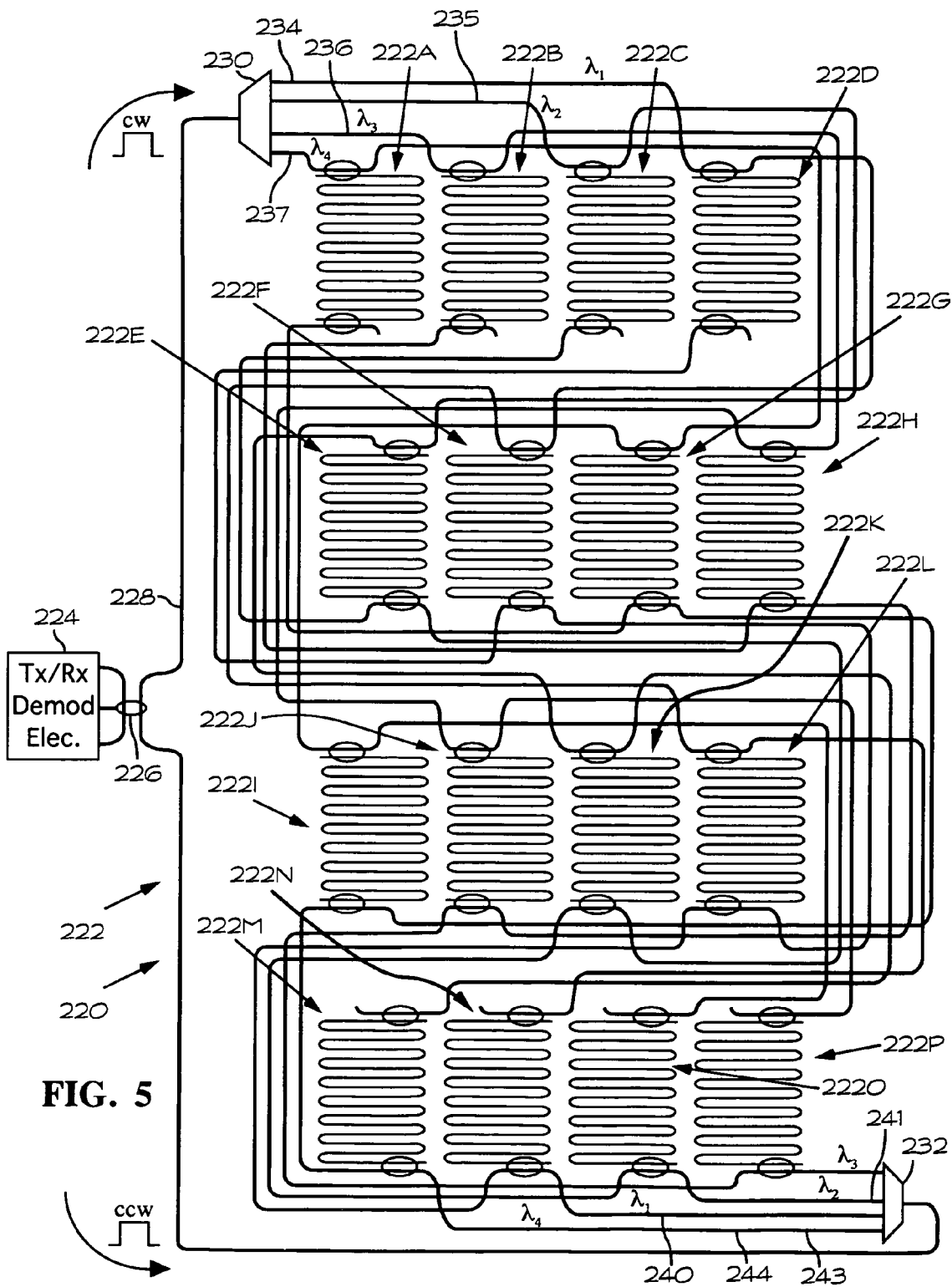
FIG. 5 illustrates a matrix perimeter zone defense array according to the present invention.

FIG. 5 illustrates a perimeter defense system 220 that includes a matrix of sensor zones 222A-222P of the type shown in FIG. 4. In this perimeter defense system 220 sensor zones operating in the same wavelength band are separated by a minimum of 2 other wavelength bands.

Still referring to FIG. 5, a transmitter/receiver module 224 provides an optical signal to an optical coupler 226. The optical coupler 226 divides the input optical signal into a clockwise wave that is coupled into an optical fiber 228 and a counter clockwise signal that is also coupled into the optical fiber 228. The clockwise and counter clockwise waves are input to corresponding wavelength slicers 230 and 232. The wavelength slicer 230 divides the clockwise wave into a plurality of wavelength bands $\lambda_1, \lambda_2, \lambda_3$ and $\lambda_4$ that are input to corresponding optical fibers 234-237 to form a plurality of clockwise waves. The wavelength slicer 232 divides the counter clockwise wave into a plurality of wavelength bands $\lambda_1, \lambda_2, \lambda_3$ and $\lambda_4$ that are input to corresponding optical fibers 240-243 to form a plurality of counter clockwise waves. The clockwise and counter clockwise waves in wavelength band $\lambda_1$ are coupled into sensor zones 222D, 222F, 222L and 222N. The clockwise and counter clockwise waves in wavelength band $\lambda_2$ are coupled into sensor zones 222C, 222E, 222K and 222M. The clockwise and counter clockwise waves in wavelength band $\lambda_3$ are coupled into sensor zones 222B, 222H, 222J and 222P. The clockwise and counter clockwise waves in wavelength band $\lambda_4$ are coupled into sensor zones 222A, 222G, 222I and 222O.

Another key element of the invention is the potential for expanding the number of sensors on the telemetry bus fibers. The telemetry bus can be designed in such a manner to allow the addition of more zones. The can be done by the appropriate selection of the tap couplers along the telemetry's length. For example in a system with four sensor zones, the idealized tap couplers would split off 25%, 33%, 50%, for the couplers located in positions 1, 2, and 3, respectively. This configuration allows for 'balanced' power for each zone. In this approach there is no room for expanding the number of detection zones as the last bus coupler is used to feed zones 3 and 4.

To build a system with expansion capabilities a slightly different approach is taken in where a tiered tap coupler approach is used in favor of adding more zones rather than having balanced signal power from each zone. In this approach the bus telemetry is design to work with a selected maximum number of zones. An ideal telemetry is then modeled to give a balanced power architecture capable of expansion to the maximum design number. An example of a twelve-zone sensor system is shown in the following table. The idealized coupler values are compared to the coupler values for array expansion. The idealized architecture uses eleven different tap ratios whereas the expansion architecture uses five tap ratios. Each of the detection zones is constructed in a modular fashion that facilitates the ability to expand the number of zones by plugging the add-on zone into the termination of the previous zone as shown in FIG. 3.

TABLE

| | Sensor position | | | | | |
|---|---|---|---|---|---|---|
| | 1 | 2 | 3 | 4 | 5 | 6 |
| Ideal Coupler | 8.3 | 9.1 | 10.0 | 11.1 | 12.5 | 14.3 |
| Expansion Coupler | 10 | 10 | 10 | 10 | 15 | 15 |
| Ideal Power (mW) | 0.083 | 0.083 | 0.083 | 0.083 | 0.083 | 0.083 |
| Expansion Power (mW) | 0.1 | 0.09 | 0.081 | 0.073 | 0.0984 | 0.0837 |

TABLE-continued

| | | | | | | |
|---|---|---|---|---|---|---|
| % Difference | −20 | −8 | 3 | 13 | −18 | 0 |
| | Sensor position | | | | | |
| | 7 | 8 | 9 | 10 | 11 | 12 |
| Ideal Coupler | 16.7 | 20.0 | 25.0 | 33.3 | 50.0 | |
| Expansion Coupler | 15 | 25 | 25 | 35 | 35 | |
| Ideal Power (mW) | 0.083 | 0.083 | 0.083 | 0.083 | 0.083 | 0.083 |
| Expansion Power (mW) | 0.0711 | 0.1007 | 0.0755 | 0.0793 | 0.0737 | 0.0737 |
| % Difference | 15 | −21 | 9 | 5 | 12 | 12 |

What is claimed is:

1. A sensor array for a perimeter defense system, comprising:
   an intensity modulated broadband optical signal source arranged to produce optical signals in a plurality of wavelength bands;
   a demultiplexer/multiplexer pair arranged to receive optical signals from the optical signal source and produce a separate optical signal for each of the plurality of wavelength bands;
   an optical coupler arranged to receive the separate optical signals;
   a first optical fiber having a first portion connected to the optical coupler and arranged to guide a clockwise wave for each of the separate optical signals along a corresponding optical path, the first optical fiber having a second portion connected to the optical coupler and arranged to guide a counter clockwise wave for each of the separate optical signals along the corresponding optical paths;
   wherein each of the corresponding optical paths includes a second optical fiber optically coupled to the first optical fiber such that the clockwise and counter clockwise waves for each of the separate optical signals are coupled into the second optical fiber and a plurality of sensors optically coupled to the second optical fiber such that the clockwise and counter clockwise waves for each of the separate optical signals propagate through the plurality of sensors and then combine in the optical coupler to form a plurality of clockwise and counter clockwise propagating interference signals in each wavelength band, the plurality of sensors being arranged in an interferometric sensor array having a plurality of sensor zones that operate in each of the plurality of wavelength bands, the sensor zones being arranged such that adjacent sensor zones operate in different wavelength bands;
   a first multiplexer optically coupled to the optical coupler to receive interference signals therefrom; and
   a first detector array arranged to receive the interference signals from the first multiplexer, the first detector array having a first selected detector corresponding to the each of the plurality of wavelength bands and arranged to provide an electrical signal that indicates the interference signals for each wavelength band.

2. The sensor array of claim 1 wherein the demultiplexer/multiplexer pair provides optical signals in a plurality of wavelength bands to a sensor array having a matrix of sensor zones that operate in each of the plurality of wavelength bands, the sensor zones being arranged such that sensor zones operating in the same wavelength are separated by at least two sensor zones operating in different wavelength bands.

3. A sensor array for a perimeter defense system, comprising:
   an intensity modulated broadband optical signal source arranged to produce optical signals in a plurality of wavelength bands;
   an optical coupler arranged to split the optical signals into a clockwise wave and a counterclockwise wave;
   a first wavelength slicer arranged to receive the clockwise wave and produce a separate clockwise optical signal for each of the plurality of wavelength bands;
   a second wavelength slicer arranged to receive the counterclockwise wave and produce a separate counterclockwise optical signal for each of the plurality of wavelength bands;
   a plurality of optical fibers coupled between the first and second wavelength slicers and arranged to correspond to the plurality of wavelength bands such that the clockwise wave and the counterclockwise wave in each wavelength band propagate in opposite directions in a separate one of the plurality of optical fibers; and
   a plurality of interferometric sensor arrays optically coupled between pairs of the plurality of optical fibers, the interferometric sensor arrays being arranged in a matrix of sensor zones that operate in each of the plurality of wavelength bands, the sensor zones being arranged such that sensor zones operating in the same wavelength are separated by at least two sensor zones operating in different wavelength bands.

* * * * *